July 6, 1926.
A. F. NECTOUX
1,591,877
DISTANCE FINDER
Filed Nov. 29, 1924
3 Sheets-Sheet 1
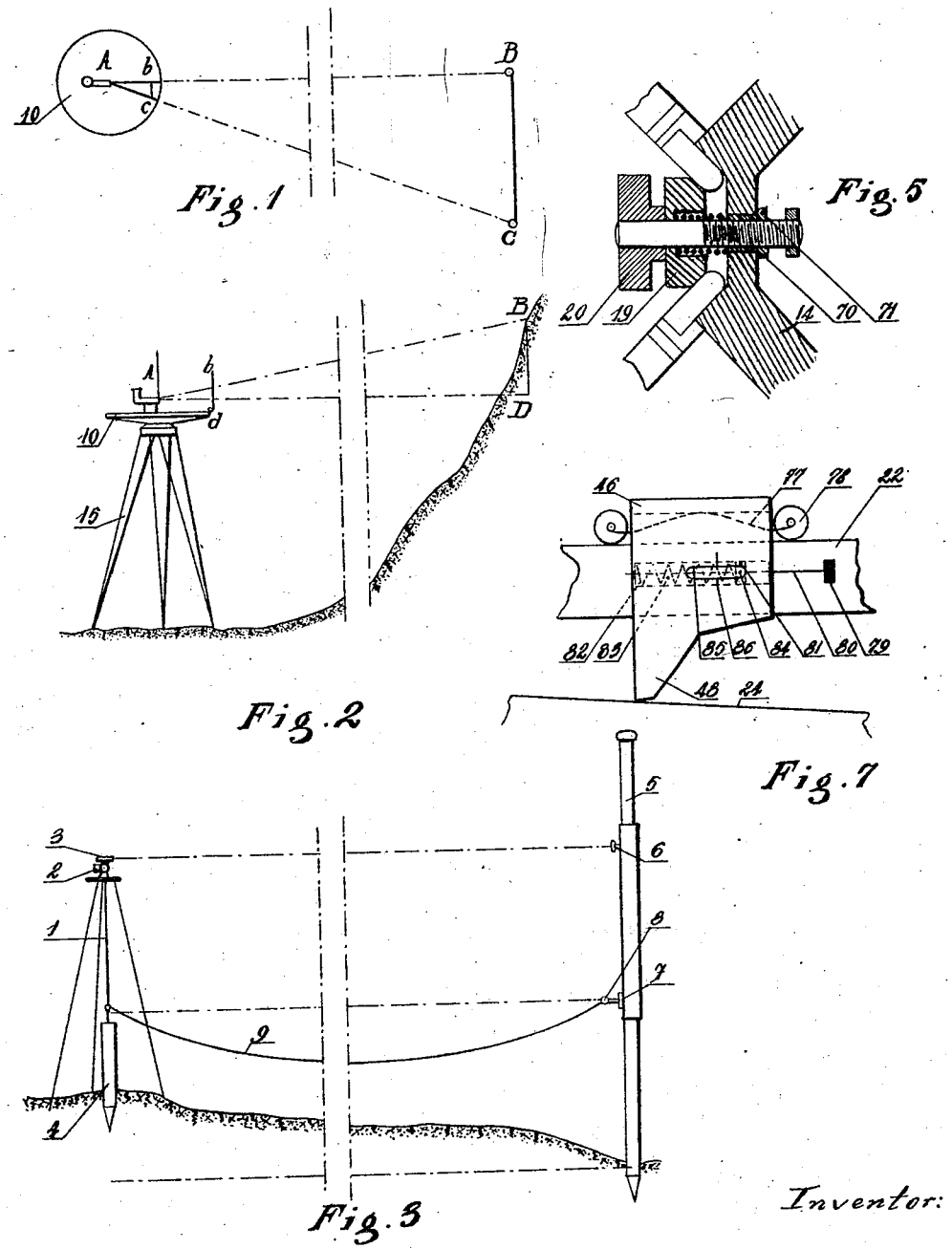
Inventor:
André François Nectoux

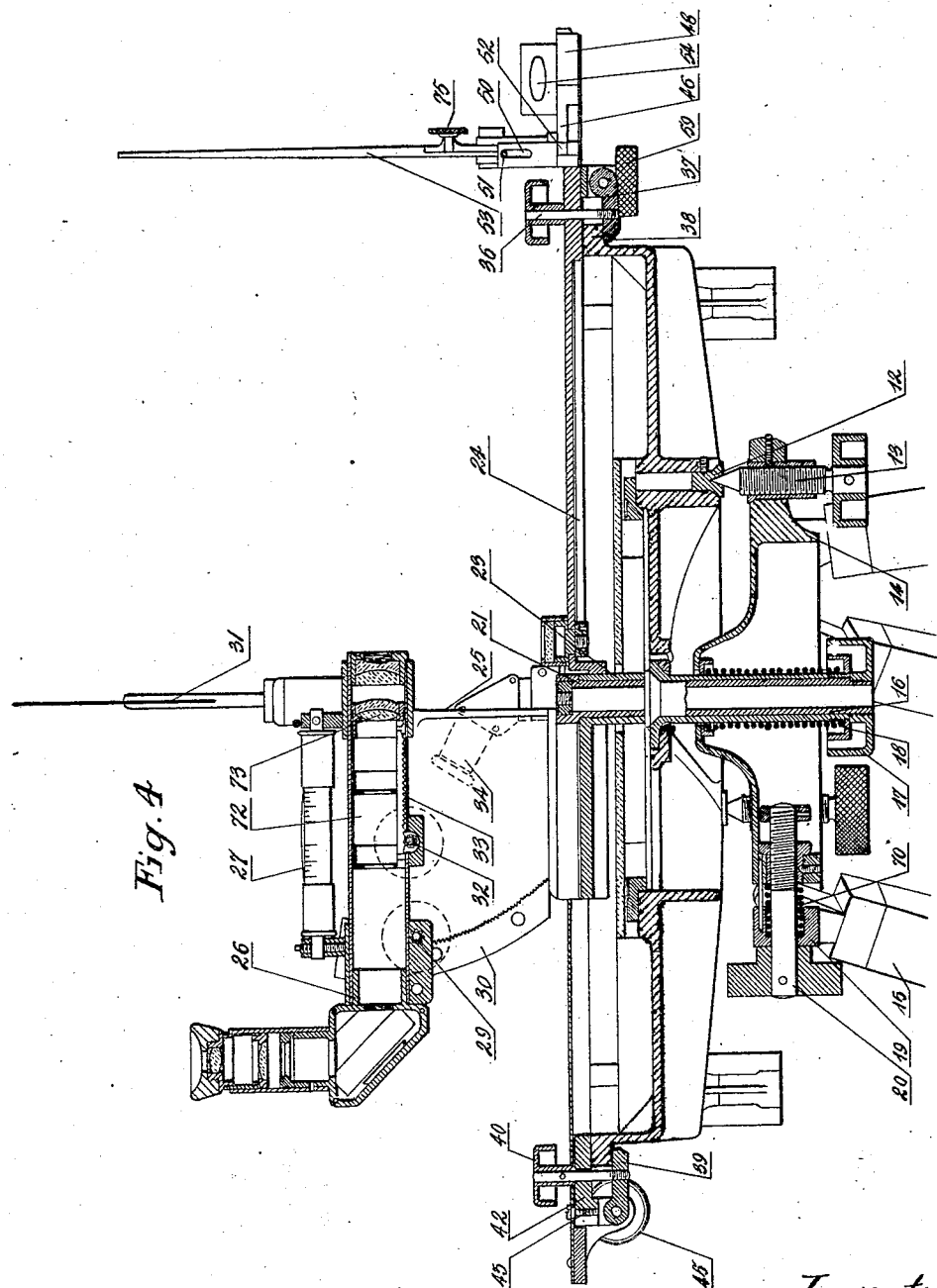

Patented July 6, 1926.

1,591,877

UNITED STATES PATENT OFFICE.

ANDRÉ FRANÇOIS NECTOUX, OF PARIS, FRANCE, ASSIGNOR TO SOCIÉTÉ DES LUNETIERS, OF PARIS, FRANCE, A CORPORATION.

DISTANCE FINDER.

Application filed November 29, 1924, Serial No. 753,002, and in France December 14, 1923.

The present invention relates to an instrument having for its object to determine with reference to the observation point the polar co-ordinates of a succession of points upon the ground to be surveyed, as well as the altitude of each point.

The instrument according to the invention, which may be further employed as a plane table, also serves to lay out the plan of the said ground.

In order to ascertain the distance of a given point with the said instrument, each operation comprises the use of two similar right-angled triangles having a common vertex located at the observation point. For one of the triangles, the vertex of the right angle is located at the point to be determined, and for the other, in the line of sight and at a short distance from the observation point; the sides, which do not pass through this point, have in each case a predetermined length.

The said theoretical system of triangles is utilized in the improved instrument by providing two cooperating rulers whereof one is directed upon the point to be determined and the other upon the end of the third side of the first triangle, this side being formed by a perpendicular line of stated length which is drawn from the said point to the line formed by the polar radius of the latter.

The second side of the right angle of the second triangle is constituted by an edge of known length of a block which is slidable upon the first mentioned ruler.

The said instrument is completed by suitable sighting glasses, graduated circles and spirit levels whereby accurate measurements may be obtained, and the relative position of the point to be observed can be plotted in a very exact manner by means of a vertical pin which is situated at the vertex of the right angle of the smaller triangle and is brought down so as to puncture a suitable piece of oil cloth which is stretched upon the instrument board.

After obtaining the distance of the said point, its altitude can be found by the use of a vertical scale placed in line with the said pin, thus offering a practical realization of the two like triangles situated in the same vertical plane.

It is thus noted that the said instrument, which is handled with great facility, can be employed by operators having but a moderate skill, so that a saving in the cost of operating will be afforded, and this is furthered by the fact that the calculations, which always require a considerable time in the ordinary topographical methods, are now eliminated.

The appended drawings drawings which are given by way of example show a practical embodiment of the said invention.

Fig. 1 is a diagram illustrating the method employed in the apparatus for the measurement of distances.

Fig. 2 is a diagram of like nature showing the method of measuring the differences of level.

Figure 6:
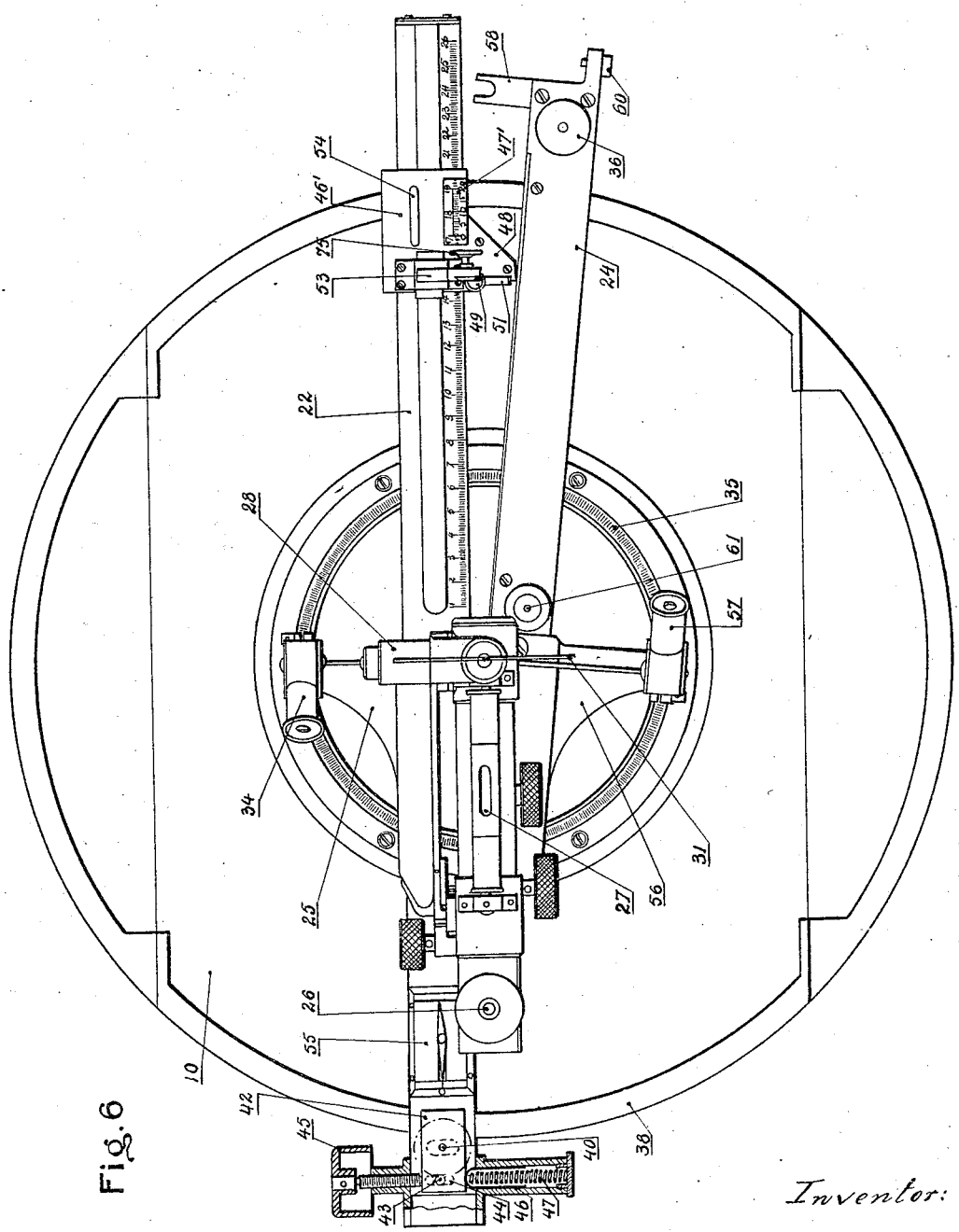

Fig. 3 relates to apparatus used for erecting upon the observed point a line of stated length perpendicular to the polar radii of the said point.

Fig. 4 is a vertical cross section of the improved surveying instrument.

Fig. 5 shows a detail of the same.

Fig. 6 is a plan view of said instrument.

Fig. 7 is a detail view of the slide.

Referring to Fig. 1, it is observed that in the method employed for measuring the distance from a point A to a point B, two similar right-handed triangles A B C and A $b$ $c$ are drawn; the sides B C and $b$ $c$ have a constant length. The ratio $$\frac{AB}{Ab} = \frac{BC}{bc}$$

offered by the two triangles allows of calculating A B, since A $b$ can be readily measured.

In Fig. 2 it is observed that the method for determining the difference of level between the point at which the instrument is placed and the point under observation is analogous to the above described method for distance finding.

According to this method two similar triangles A B D and A $b$ $d$ are laid out which are situated in a common vertical plane; these triangles will immediately afford the ratio $$\frac{BD}{bd} = \frac{AD}{Ad}$$

in which A D is known and $b$ $d$ and A $d$ can be readily measured.

Fig. 3 shows the instruments used upon the ground for marking out the line perpendicular to the radius A B starting from the point B and for limiting this perpendicular to a constant and specified length. One of the said instruments is an optical square mounted upon the tripod support 1, and comprising a spirit level and a right-angled telescope 2, upon which latter is mounted a collimator 3 making a 90° angle with the line of sight of the said telescope. A stake 4 is normally used with the telescope; it is sunk into the ground at the point to be determined, and the telescope is placed above the same so that the collimator shall be situated in the vertical axis.

A secondary device employed for determining the line A B is a leveling rod 5 comprising a slide vane 6 which is secured to an attaching piece 7 provided with a dynamometer spring 8 to which is attached one end of a steel tape 9 of a given length (usually 20 metres) which is connected at the other end to the top of the stake 4. The vertical distance between the collimator 3 and this end of the tape should be equal to the distance between the slide vane 6 and the attaching point 7, so that the line of sight of the collimator will be parallel to the line connecting the top of the stake to the attaching point 7.

The instrument according to the invention is adapted for use at the observation point. It comprises essentially a circular board 10 which is mounted at the top of a support 15 and has disposed thereon various measuring devices.

The sheet of paper or oil cloth upon which the points are plotted is stretched upon and attached to the said board by suitable means, known per se. Three bearings 12 projecting below the said board and rigidly connected therewith are adapted to rest respectively upon the pointed ends of three screws 13 which are suitably mounted in the head 14 of the support 15. The said board and the head 14 are connected together by means of a pivot axle 16 which is provided with a shoulder fitting accurately in a recess formed at the centre of the said board, said axle ending at the bottom in a milled head 17 supporting the spring 18 which abuts at the other end below the head 14 traversed by the said axle.

The six branches of the said support (see Fig. 5), which are disposed in pairs, are pressed against the head 14 by means of the wedges 19; each wedge is urged outwardly by the spring 70 and is controlled by a screw 20 cooperating with a nut 71 secured to the said head. The whole device for securing the branches as above arranged will thus require the use of three wedges each of which serves for two adjacent branches not forming part of the same set.

Upon the upper end of the axle 16 is mounted the bearing 21 upon which are pivoted the ruler 22 situated upon a diameter and a radial ruler 24. At the central part of the diametral ruler 22 is a support 25 upon which is mounted the telescope 26 of the optical square type having thereon a spirit level 27 and adapted to be rocked about a horizontal axle 28 by means of a pinion 29 engaging a toothed sector 30. A sighting device 31 situated in line with the axle 16 is disposed above the said telescope and may be adjusted in position by means of a pinion 32 acting through the medium of the rack 33 upon the tube 72 carrying the lens 73.

Upon the support 25 is mounted a second telescope or sighting glass 34 for observing the graduated scale 35 disposed in a circular recess surrounding the axle 16 and adapted to be closed by a suitable cover. One branch of the ruler 22 is accurately finished upon one of its faces which passes through the centre of the board and is suitably graduated. The slide 46 is movable along the latter branch; and it has formed therein an opening 47 with a suitable scale serving as a vernier and is provided with a block 48 having an edge of determined length which is perpendicular to the said radial face of the ruler 22. At the vertex of the right angle thus formed is vertically disposed a socket 49 having movable therein against a spring (not shown) a plunger 50 which is provided with a stop or stud 51 and carries at the bottom the pointer 52. Upon the said slide is also mounted a graduated scale 53 situated on the same vertical line as the pointer 52; it may be folded down when not in use, a set screw 75 being provided to retain it in adjusted position. A spirit level 54 is also mounted upon the said slide.

The second branch of the ruler 22 is provided with a compass 55; its end is supported by the outer edge 38 of the board 10 through the medium of a block 42 which is attached to the said ruler by means of the screw 43 which is suitably engaged in the slot 44. A tongue 39 which is capable of pivoting with respect to the said block under the control of the screw 40 is adapted to press against the said edge and to tighten the whole device. A horizontal screw 45 mounted in the said ruler and a stud 46' pressing against the latter by means of the spring 47' are also disposed at either side of the block 42 for the accurate adjustment of the said ruler.

The radial ruler 24 is secured to a support 56 analogous to the support 25, and is provided like the latter with a sighting glass 57 of the same type as the glass 34. The ruler 24 may be maintained against the outer edge 38 of the board 10 by means of a device analogous to the one above described but comprising only the tongue 37 controlled by the screw 36. A slotted arm 58 is adapted to engage the screw 59 which traverses the end of the straight branch of the diametral ruler 22, thereby connecting the latter to the ruler 24 which has also an accurately prepared straight side. A small horizontal screw 60 is interposed between the two rulers in order that the two straight sides may be disposed exactly parallel. A circular spirit level 61 is suitably disposed upon the ruler 24.

As above mentioned, the said instrument serves for direct readings or as a plane table, and in the latter case, a sheet of paper or preferably a piece of oil cloth is stretched upon the board 10 which latter is provided for the purpose with a central aperture for the insertion of the axle 16.

The operation is as follows:

The apparatus is set in direction by the use of the compass 55; during this time the operator's assistants make use of the telescope and the slide 6 to draw from the point B whose distance is to be measured, and upon the polar radius of said point, an imaginary perpendicular line B C of determined length; for this purpose they sight with the glass 2 upon the disc 31 of the instrument, and with the collimator 3 upon the slide 6 of the leveling rod 5; which latter is planted in such manner that the steel tape 9 shall be stretched but without acting upon the dynamometer spring.

The operator who is stationed at the observation point then connects together by the means of the screw 59 and arm 58 the rulers 22 and 24 which have been made parallel, and then sights upon the slide 6; the ruler 24 is clamped by means of the tongue 37 against the edge 38, the adjustment being completed by the use of the screw 45; he then releases the ruler 22 and sights the point B, operating in the same manner, after which he pushes the slide 46 until the edge of the block 48 enters into contact with the ruler 24; at this time by pressing upon the stud 51 he causes the pointer 52 on the plunger 50 to make a dot on the paper at the desired point.

In order to lay out the desired plan the cover of the circular scale 35 is preferably put in place. On the contrary, in operations for the numerical determination of the position of the point B, the said cover must be removed in order to disclose the graduated scale portion, and in this event a large circular hole must be made in the paper or oil cloth stretched upon the board.

As in the preceding case, when the perpendicular line has been marked out by the assistants, the operator sights the slide 6, clamps the ruler 24, sights the point B, and pushes the slide 46 so as to bring the block 48 into contact with the ruler 24; he then takes the reading at the vernier, and by a simple calculation he is enabled to determine the distance of the observed point in an accurate manner.

By looking through the glasses 57 and 34 he can also find the angle between the rulers with great facility and hence, as may be readily conceived, the angle between the sighting line on the point B and a line representing a stated direction which has been preliminarily marked out.

The altitude of the point B can also be found by observing the difference of level between this point and the observation point; for this purpose the operator adjusts the sight glass in such manner as to render it horizontal; he then sights upon the point B by pivoting the glass by means of the pinion 29, and then reads the corresponding division of the vertical scale 53. This will indicate the value of a quantity which is proportional to the difference of level sought for. Since this proportion can obviously be found according to the preceding operations, the difference of level will be therefore determined.

Fig. 7 shows a device whereby the edge of of the block 48 may be brought against the ruler 24 with the same pressure at all times. For this purpose, the effects of friction to be overcome in order to displace the slide 46 must be substantially constant. One side of the said slide is provided with a spring 77 attached to the rollers 78 which are thus maintained in contact with the ruler 22, so that friction will only occur on the other side.

The said block is displaced by means of a button 79 mounted upon a rod 80 which is provided with a plunger 81 that bears against the adjacent end of a spring 82 disposed in a longitudinal recess 83 in the slide; the other end of the spring bearing against the inner end wall of the recess, so that the inward movement of rod 80 and its plunger will thus be transmitted through the spring to the aforesaid end wall of the recess and will act to shift the slide in the same direction. It is to be observed, however, that the spring must be compressed to some extent before it will transmit sufficient pressure to move the slide; and in the construction illustrated, the plunger 81 is equipped with a pin or pointer 84 which projects into a short longitudinal guide slot 85 formed in the top of the slide which opens into recess 83, the movement of the slide commencing when said pin reaches a mark 86 located on the upper surface of the slide and intersecting such slot.

Obviously, the arrangements hereinbefore set forth are susceptible of detail modifications without departing from the spirit of the invention, and in particular the means indicated for completing the adjustment for setting the ruler are given solely by way of example, and the same applies to the means for setting the rulers upon the instrument board.

I claim:

1. In a distance finder, the combination of a base plate; a pair of coacting rulers mounted thereon to pivot about a common axis in variable angular relation, one ruler being graduated; clamping means individual to the rulers for independently securing them to the base plate; means for releasably connecting the rulers together; a telescope carried by the graduated ruler to sight along the same towards a distant point; a slide carried by said graduated ruler to contact with the adjacent face of the other ruler; a graduated vertical scale carried by the slide in the line of sight of the telescope to indicate the altitude of said point; and an annular graduated scale on said base plate concentric with the common pivotal axis of the two rulers to indicate their angular relation.

2. In a distance finder, the combination of a base plate; a pair of coacting rulers mounted thereon to pivot about a common axis in variable angular relation, one ruler being graduated; clamping means individual to the rulers for independently securing them to the base plate; means for releasably connecting the rulers together; a telescope carried by the graduated ruler to sight along the same towards a distant point; a slide carried by said graduated ruler provided with a block having an edge of predetermined length which is perpendicular to one face of the ruler and which is adapted to abut against the adjacent face of the other ruler; a graduated vertical scale carried by the slide in the line of sight of the telescope to indicate the altitude of said point; and an annular graduated scale on said base plate concentric with the common pivotal axis of the two rulers to indicate their angular relation.

3. A distance finder, according to claim 2, in which the base plate is adapted to support a plotting sheet; and in which a hand-operated plunger is mounted on the slide at the apex of the right-angle formed by the perpendicular edge of the block and the adjacent face of the ruler which carries said slide, said plunger having a pointer mounted on it to make a mark on the plotting sheet when the plunger is depressed.

4. In a distance finder, the combination of a base plate; a pair of coacting rulers mounted thereon to pivot about a common axis in variable angular relation, one ruler being graduated; a clamping tongue pivotally connected to each ruler to engage the edge of the base plate and thereby hold the ruler in adjusted position; an operating screw for each tongue; means for releasably connecting the rulers together; a telescope carried by the graduated ruler to sight along the same towards a distant point; a slide carried by said graduated ruler to contact with the adjacent face of the other ruler; a graduated vertical scale carried by the slide in the line of sight of the telescope to indicate the altitude of said point; and an annular graduated scale on said base plate concentric with the common pivotal axis of the two rulers to indicate their angular relation.

5. In a distance finder, the combination of a base plate; a pair of coacting rulers mounted thereon to pivot about a common axis in variable angular relation, one ruler being graduated; clamping means individual to the rulers for independently securing them to the base plate; means for releasably connecting the rulers together; a telescope carried by the graduated ruler to sight along the same towards a distant point; a slide carried by said graduated ruler to contact with the adjacent face of the other ruler and bearing a fixed indicating mark; and a spring-loaded element for displacing said slide mounted on the slide and provided with a pointer for cooperation with said mark.

6. In a distance finder, the combination of a base plate; a pair of coacting rulers mounted thereon to pivot about a common axis in variable angular relation, one ruler being graduated; clamping means individual to the rulers for independently securing them to the base plate; a telescope carried by the graduated ruler to sight along the same towards a distant point; a slide carried by said graduated ruler provided with a block having an edge of predetermined length which is perpendicular to one face of the ruler and which is adapted to abut against the adjacent face of the other ruler; and an annular graduated scale on said base plate concentric with the common pivotal axis of the two rulers to indicate their angular relation.

In testimony whereof I affix my signature.

ANDRÉ FRANÇOIS NECTOUX.